United States Patent [19]

Hibino et al.

[11] 4,141,853
[45] Feb. 27, 1979

[54] LIQUID CRYSTAL MATERIAL

[75] Inventors: Shinichi Hibino, Nara; Takaaki Miyazaki, Hommachi; Keiji Nakayama, Nara, all of Japan

[73] Assignee: Sharp Kabushiki Kaisha, Osaka, Japan

[21] Appl. No.: 840,031

[22] Filed: Oct. 6, 1977

[30] Foreign Application Priority Data

Oct. 6, 1976 [JP] Japan .............................. 51/120540
Nov. 30, 1976 [JP] Japan .............................. 51/146020

[51] Int. Cl.² .......................... C09K 3/34; G02F 1/13
[52] U.S. Cl. .................................. 252/299; 252/408;
260/465 D; 350/350
[58] Field of Search .............................. 252/299, 408;
350/160 LC, 350

[56] References Cited

U.S. PATENT DOCUMENTS

| 3,915,883 | 10/1975 | Van Meter et al. | 252/299 |
| 3,947,375 | 3/1976 | Gray et al. | 252/299 |
| 3,953,491 | 4/1976 | Steinstrasser et al. | 252/299 |
| 3,974,087 | 8/1976 | Gray et al. | 252/299 |
| 3,984,344 | 10/1976 | Cole, Jr. | 252/299 |
| 4,001,137 | 1/1977 | Steinstrasser | 252/299 |
| 4,011,173 | 3/1977 | Steinstrasser | 252/299 |
| 4,017,416 | 4/1977 | Inukai et al. | 252/299 |
| 4,020,002 | 4/1977 | Oh | 252/299 |
| 4,043,935 | 8/1977 | Kanbe | 252/299 |
| 4,046,708 | 9/1977 | Dubois | 252/299 |
| 4,048,089 | 9/1977 | Arai et al. | 252/299 |
| 4,058,478 | 11/1977 | Doller et al. | 252/299 |
| 4,065,489 | 12/1977 | Steinstrasser et al. | 252/299 |
| 4,069,167 | 1/1978 | Inukai et al. | 252/299 |

FOREIGN PATENT DOCUMENTS

| 2456083 | 6/1975 | Fed. Rep. of Germany | 252/299 |
| 2502904 | 7/1975 | Fed. Rep. of Germany | 252/299 |
| 2538865 | 3/1976 | Fed. Rep. of Germany | 252/299 |
| 50-23385 | 3/1975 | Japan | 252/299 |

Primary Examiner—Benjamin R. Padgett
Assistant Examiner—T. S. Gron
Attorney, Agent, or Firm—Birch, Stewart, Kolasch and Birch

[57] ABSTRACT

Liquid crystal material suitable for use in small display devices and consisting of one or more biphenyl or terphenyl compounds and one or more ester compounds, whereby low threshold voltage characteristics of one type of compound are complemented by the low viscosity and good response characteristics of the other type of compound, and liquid crystal material having good overall characteristics is achieved.

2 Claims, 6 Drawing Figures

LIQUID CRYSTAL MATERIAL

The present invention relates to liquid crystal material for employment in display devices wherein the optical properties of the liquid crystal are changed by application thereon of an electric field. More particularly, the invention relates to positive dielectric anisotropic nematic liquid crystal material for which the threshold voltage for effecting a required change of optical properties is low, and which is stable over a wide temperature range.

It is known that certain liquid crystals which have long and strongly polar molecules may exist, between the solid and liquid phases, in a mesophase in which there is long range ordering of the molecules.

An example of known use of liquid crystal material is to constitute a display cell by enclosing between two glass plates positive dielectric anisotropic liquid crystal material. Polarizers at right angles to one another are bonded to the outside opposite glass plates and transparent electrodes are bonded to the insides of the plates. The plates are arranged and receive surface treatment to cause the molecules of the liquid crystal material to be oriented in a helix with a 90° twist. In the absence of an applied electric field on the display cell, light passing through the cell is turned through 90° by the liquid crystal material, which thus off-sets the effect of the attached polarizers, whereby light incident on one side of the cell may pass through the cell and appear at the other side of the cell. If however an electric field is applied, via the electrodes, on the liquid crystal material, molecules of the material form a homestropic phase and therefore have no polarizing effect, with the result that the cell is now equivalent to a crossed polarizer system, and stops passage of light therethrough. A required display by such a cell is obtained by selecting a suitable electrode pattern. The same principles of course apply if, instead of light being incident on one side of the cell and a display being viewed on the opposite side thereof, the cell further comprises a reflector provided on one side thereof and light is incident on and a display is viewed on the opposite side of the cell.

Required characteristics of liquid crystal material employed in display means may be summarized as follows.

(1) Liquid crystal temperature range

Since display devices are normally employed in a temperature range of 0° C.–40° C., the liquid crystal temperature range, i.e., the temperature range in which the liquid crystal material exists as the abovedescribed mesophase should be broad and be at least −10° C. to 50° C.

(2) Threshold voltage

If power consumption of the display device is to be kept low, the threshold voltage, which is the voltage required to cause the molecules of the liquid crystal material to move sufficiently from a normal orientation for optical effects to be observable, must be low. Threshold voltage $V_{th}$ is related to anisotropic inductivity $\epsilon$ of liquid crystal material as follows:

$$V_{th} \propto \sqrt{1/\epsilon}$$

In other words the liquid crystal material should preferably have high anisotropic inductivity $\epsilon$. Threshold voltage must necessarily be low in display devices such as desk-top calculators, since in such devices available space for, and capacity of power batteries is limited, and particularly, for calculators must be controlled to fit the bias voltage determined by battery voltages and the drive system in order to obtain good reliability.

(3) Response time

This is the time required for a display cell to change from an 'off' to an 'on' state, or vice-versa, upon application of an 'on' signal or an 'off' signal. Response time for a given material varies depending on display cell thickness, switching drive mode, and also viscosity of the material but in general should be 300 msec or less at 25° C. and 700 msec or less at 0° C.

(4) Orientability

Within the liquid crystal temperature range, the molecules of the liquid crystal should be well-ordered in the normal state and be able to be easily aligned in a normal orientation by contact with surface-treated glass or other substrate constituting a display cell enclosure. For this to be achieved it is preferable that the liquid crystal material have low surface tension and the substrate be easily wettable by the liquid crystal material.

(5) Current consumption

This should be low, and is the sum of capacitive current and DC current required to drive the display device. Capacitive current depends on the dielectric constant of the liquid crystal material, and is constant for a given threshold voltage. DC current consumption depends on purity of the liquid crystal material and is generally assessed indirectly.

(6) Reliability

A display device must maintain required characteristics for a long period, and since from the point of view of production costs it is generally not practical to effect completely hermetic sealing of display devices, liquid crystal material employed for display purposes must be chemically stable, and have good resistance to water, alkalis and acids. In particular, deterioration of chemical properties of liquid crystal material may result in increased consumption of power by a display device, and hence reduced service life of the battery means employed as a power source, as well as increased cost.

Of the known liquid crystal materials none satisfies all the abovenoted requirements, and to obtain a satisfactory display device material, therefore, it is necessary to employ a mixture of different materials.

Examples of the structure of liquid crystal materials include Shiff's bases

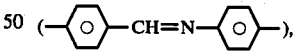

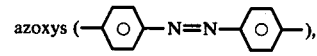

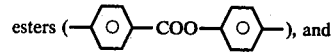

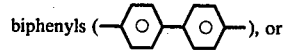

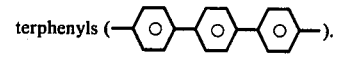

Of these materials, Shiff's bases have the disadvantages that they are highly viscous and so have slow response speeds, and that their reliability is low since they are extremely weak to attack by water. The azoxys generally have low anisotropic inductivity, and hence require comparatively high values of threshold voltage. The esters are chemically stable, but also have high viscosity, and hence unsatisfactory response characteristics.

The biphenyls are chemically stable, and when employed in suitable mixtures can give satisfactory response speeds. However, if the mixture consists solely of biphenyls, very little variation of anisotropic dielectric constant is achieved by varying components of the mixture, and it is therefore not possible to lower threshold voltage below a set value.

In order to achieve a lower threshold voltage, the mixture of liquid crystal material should include an admixture of Schiff's base or ester material, which has a higher anisotropic dielectric constant.

Alternatively, negative liquid crystal material, i.e., material having negative dielectric anisotropy, may be added, although this material is less effective in reducing threshold voltage. Negative liquid crystal material which may be added includes Schiff's bases, azoxys, biphenyls, and esters. Schiff's bases, however, do not mix well, azoxys have the disadvantage that if present to a certain amount in the mixture they result in poor orientation of molecules at low temperature, while known biphenyls do not permit production of material having a wide temperature range. Esters have comparatively good mutual solubility with other liquid crystal materials, but if the other materials of the mixture do not have a wide liquid crystal temperature range, the resulting mixture fails to meet all of the abovenoted requirements.

It is an object of the invention to meet these requirements by providing material, in which biphenyl liquid crystal material, or a mixture of such material, which has good characteristics in general, but for which the threshold voltage is rather high, is mixed with an ester, which is chemically stable, but which is very viscous and therefore has comparatively slow response, whereby the advantages of the different components of the mixture are combined to give improved overall characteristics in a liquid crystal display device.

Liquid crystals according to the invention consist of a mixture of one or more of the biphenyl compounds representable by the general formula

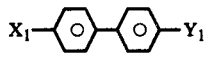

and one or more of the ester compounds representable by the general formula

in which formulae $X_1 = C_nH_{(2n+1)}$ or $C_nH_{(2n+1)} \cdot O$, n being a number in the range of from 4 to 8 in either case, $$Y_1 = -Cn \text{ or } \begin{array}{c}\text{—}\langle O \rangle\text{—CN,}\end{array}$$

$X_2 = C_nH_{(2n+1)} \cdot O$ or $C_nH_{(2n+1)}$, n being a number in the range of from 1 to 8 in either case, and $Y_2 = C_nH_{(2n+1)}$, or $C_nH_{(2n+1)} \cdot O$,

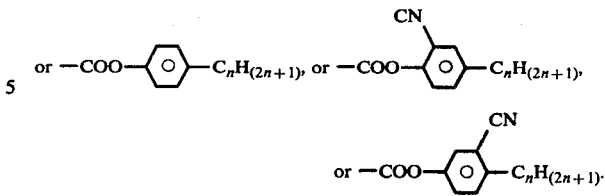

According to the invention, a liquid crystal material having requisite characteristics is also achieved by a mixture of at least one ester compound having the general formula

$R'$ being a straight-chain alkyl group having a carbon number in the range 4–8, and at least two compounds selected from biphenyl compounds and terphenyl compounds, i.e., compounds representable by the general formulae

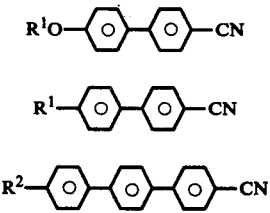

$R^1$ being a straight-chain alkyl group having a carbon number in the range 4–8, and $R^2$ being $n-C_5H_{11}$.

The invention will be described below in reference to several specific examples thereof and also with reference to the attached drawings, in which like numbers refer to like parts, and FIG. 1(a) is a plane view of display cell containing liquid crystal material according to the invention and employed for measurement of threshold voltage and response time;

Figure 1A:
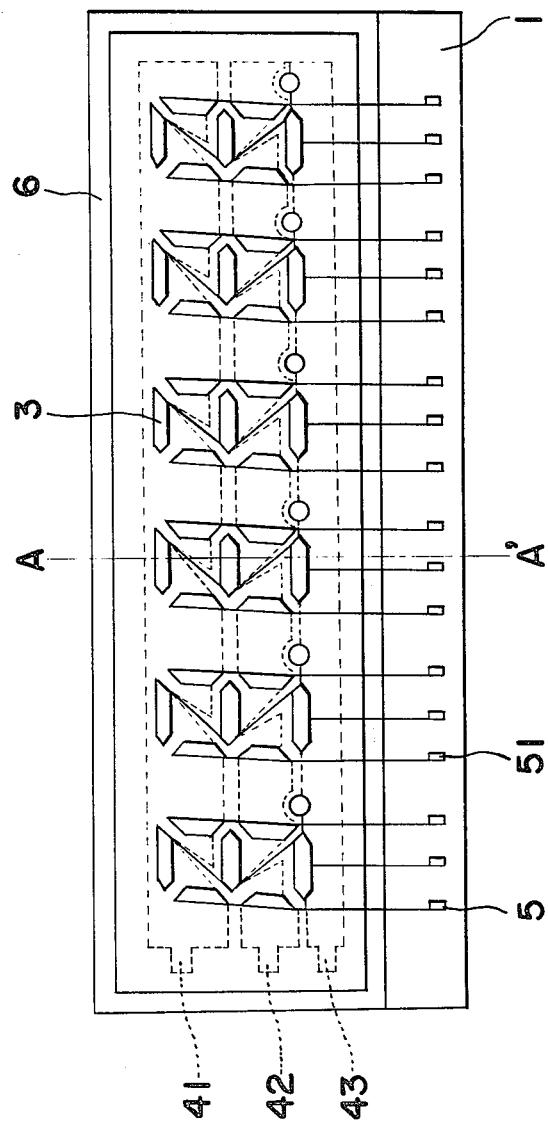
FIG. 1(b) is a cross-sectional view taken along the line A — A of FIG. 1(a)
Figure 1B:
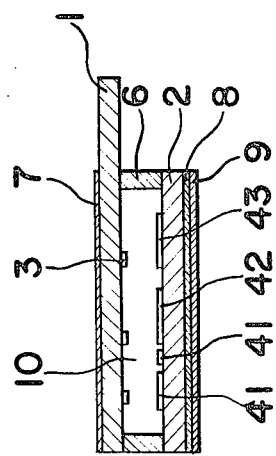

Referring to FIG. 1, a typical liquid crystal display device comprises liquid crystal material 10 contained in an area defined between a pair of parallel glass plates 1 and 2, and seal and spacer elements 6. The glass plates 1 and 2 receive surface treatment in order to achieve the abovedescribed orientation of molecules of the material 10, and after surface treatment and mounting in the display cell are rubbed with suitable material to enhance orientation of molecules of the liquid crystal material 10 the plates 1 and 2 being so disposed that the directions of rubbing thereof are at right-angles. A plurality of sets of transparent electrodes 3, each constituting a segment display are bonded to the inside of the glass substrate 1. Attached to the inside of the glass plate 2 there are three separate electrodes 41, 42, and 43 which extend the length of the display cell, and each of which lies opposite particular electrodes of the sets of electrodes 3. Each set of electrodes 3 is connected to an external drive signal source by terminals 5 . . . , each of which connects, either directly or via extension lines, to two or more electrodes of the corresponding set of electrodes 3 in a known arrangement in which any electrodes of a set of electrodes 3 which connect to the same terminal 5 . . . face different electrodes 41 . . . . The electrodes 41 . . . comprise cut-out portions as necessary so that the electrodes 41 . . . are not in line with extension lines of the terminals 5. Polarizers 7 and 8, which are at right-angles to one another are bonded to the outsides of the glass substrates 1 and 2, respectively. A reflector 9 is bonded to the outside of polarizer 8, a display thus being viewable at the plate 1 side of the display cell.

Such a cell may be driven, to produce a required display, by the so-called $\frac{1}{3}$ bias — $\frac{1}{3}$ duty drive mode which is described briefly below in reference to FIG. 2, in which the upper portion shows the waveform of voltage which is repeatedly applied on electrode 41, the center portion shows waveform of an 'on' signal for causing display to be given by a particular electrode 3 constituting a display segment, and the lower portion shows waveform of an 'off' signal for causing a display segment not to give a display. Voltage of the same waveform but of successively lagging phase is applied on electrodes 42 and 43 also. Frequency of all applied voltages is suitably 200 Hz. Supposing that the threshold voltage of the liquid crystal material 10 is V', the voltage steps V1-V4 are arranged so that $V' = V1-V2 = V2-V3 = V3-V4$. In the $\frac{1}{3}$ bias — $\frac{1}{3}$ duty drive mode, supposing it is required to cause display by the segment electrode 31 indicated by hatched line s in FIG. 1 and connecting to terminal 51, an 'on' signal of the indicated waveform applied at terminal 51 results in a voltage greater than the threshold voltage V' being imposed during periods +1 and +4 on that portion of the liquid crystal material 10 which lies between the segment electrode 31 and electrode 41, whereby the required segment 31 appears as a display against a contrasting background constituted by the other portions of the material 10 and the display cell. During periods t2 and t3 a 1V' bias is maintained between the segment electrode 31 and electrode 41 to prevent complete realignment of molecules of the material 10, and the net result is that display by the segment 31 appears as continuous. If the 'on' signal at terminal 51 is maintained, bias voltage of 1V' is applied during periods t5 and t6, and then a voltage of 3V' is applied across segment electrode 31 and electrode 41 in period t1 of the next cycle, whereby display by segment 31 is made continuous.

During this time, the 'on' signal is also applied to another segment electrode, which in FIG. 1 is shown immediately below the segment electrode 31. However, since this other segment electrode faces the common electrode 42 and voltage applied on the electrode 42 lags that applied on the electrode 41, voltage across this segment electrode and the electrode 42 does not exceed 2V', i.e., is less than the threshold voltage of material 10, during the abovedescribed cycle, and display is effected by this electrode segment only if the 'on' signal to terminal 51 coincides with the waveform of voltage applied on common electrode 42 in the same manner as shown in FIG. 2.

Figure 2:
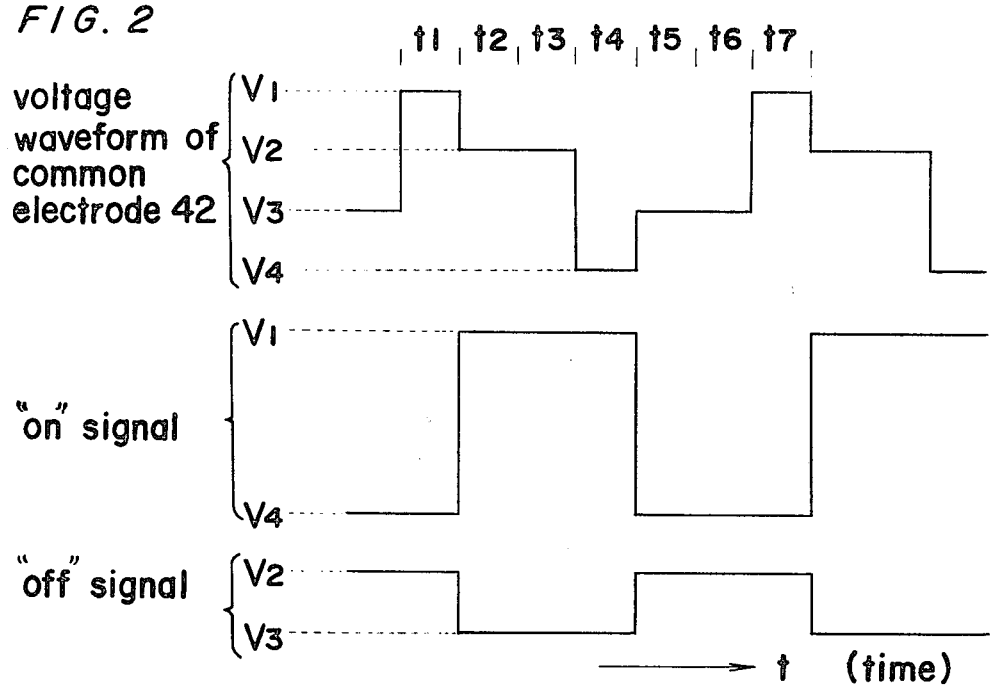
FIG. 2 is a timing chart showing wave-forms of voltages applied to drive the display cell of FIG. 1.

To completely prevent display by either of the segment electrodes connecting to terminal 51, there is applied on terminal 51 an 'off' signal which, as indicated in the lower portion of FIG. 2 varies between 2V and 3V, and prevents voltage across the segment electrodes and the common electrodes from exceeding 1V' during any portion of the cycles of voltage applied on the common electrodes.

The abovedescribed $\frac{1}{3}$ bias — $\frac{1}{3}$ duty drive mode has the advantages that it requires simpler circuitry and less output terminals than the so-called static drive mode, in which a control input terminal must be provided for each individual segment electrode. The so-called $\frac{1}{4}$ duty drive mode requires even less output terminals but often results in poor quality of display.

The liquid crystal material according to the invention is particularly suited, although not necessarily limited, to use in a display device employing a $\frac{1}{3}$ bias — $\frac{1}{3}$ duty drive mode, since, as made clear from test results described below, it has low threshold values and rapid response time, whereby only low voltages and small voltage ranges are required for display control, and display may be effected rapidly.

A plurality of display cells such as described in reference to FIG. 1, each 7 to 9 mm thick, where were constructed and used in tests for measuring characteristics including threshold voltage, and response of liquid crystal material according to the invention, the display cells being driven in $\frac{1}{3}$ bias — $\frac{1}{3}$ duty drive mode in the tests.

Figure 3:
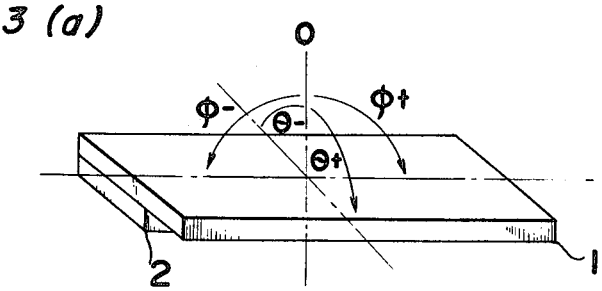
FIG. 3(a) is an explanatory perspective view in illustration of the angle from which measurement of threshold voltage was made.
FIG. 3(b) is a side view corresponding to FIG. 3(a)

In FIG. 3, in measurement of threshold voltage, voltage having a frequency of 1 Hz was applied across opposed electrodes, and the voltage at which a display effect was achieved was determined by observation along a line which, taken in reference to two planes $\theta$ and $\Psi$ at right-angles to one another and perpendicular to the plane of the plate 1 side of the display cell, was completely on the plane $\theta$, and was at an angle of 60° to the vertical, i.e., $\theta° = 60°$, $\Psi° = 0$.

Figure 4:
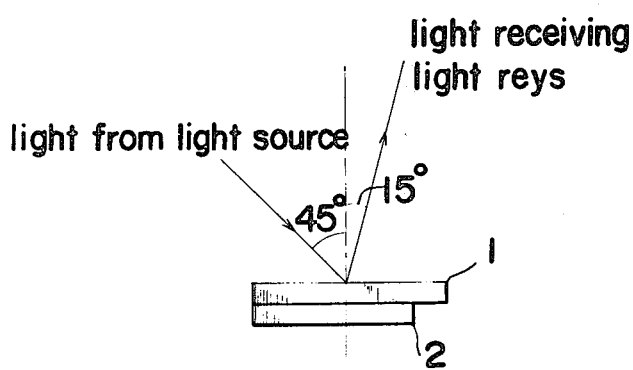
FIG. 4 is a schematic view illustrating set-up for measurement of response time.
Figure 3:
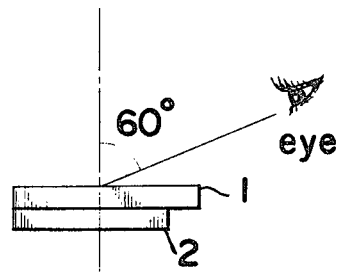

In FIG. 4, to measure response, light from a light source was directed onto the display surface, i.e., the electrode 1 side, of the display cell at an angle of 45° to the vertical, and reflected light was metered by a metering device which was positioned to receive light rays reflected at an angle of 15° to the vertical and at an angle of 60° to the angle of incidence thereon on the display cell. Taking the amount of light received by the metering device when the display cell was unactuated to be the standard amount, the rise time Tr was expressed as the time elapsing between application of an 'on' signal and fall of the amount of light received to 10% of the standard amount, and the fall time Td was expressed as the time elapsing between application of an 'off' signal subsequent to an 'on' signal and rise of the amount of light received to 90% of the standard value.

Liquid crystal materials employed in the tests were as follows, the proportions noted being percentage by weight.

EXAMPLE 1

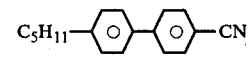

49%

-continued

C$_7$H$_{15}$—⟨O⟩—⟨O⟩—CN   29%

C$_8$H$_{17}$O—⟨O⟩—⟨O⟩—CN   14%

C$_5$H$_{11}$—⟨O⟩—⟨O⟩—⟨O⟩—CN   8%

This mixture, which is manufactured and sold on the commercial market with a trade-name of "E7" by B.D.H. Chemicals Ltd., of U.S.A. and is referred to as mixture A below, has a liquid crystal temperature range of 60° C.-10° C. There was also prepared a mixture B having the following composition and which is manufactured and sold on the commercial market with a trade-name of "ZL389" by E. Merck Darmstadt of West Germany.

There was also prepared a mixture B having the following composition.

CH$_3$O—⟨O⟩—COO—⟨O⟩—C$_5$H$_{11}$   57.3%

C$_6$H$_{13}$O—⟨O⟩—COO—⟨O⟩—C$_5$H$_{11}$   28.7%

C$_6$H$_{13}$O—⟨O⟩—COO—⟨O⟩—COO

—⟨O⟩—C$_5$H$_{11}$ (CN)   14.0%

Mixture B has a liquid crystal temperature range of from 60° C.-20° C.

Mixtures A and B were mixed in various proportions, and employed in tests to determine nematic - isotropic transition point, threshold voltage, and response times, the test results being shown in Table 1, in which N - I transition point indicates nematic-isotropic transition point, V.r.m.s. is effective voltage, Tr is rise time, Td is fall time, and X indicates proportions of mixtures A and B as follows: Mixture A:Mixture B = 1 — X:X.

Table 1

| x | Liquid crystal temperature range N-I transition point (° C) Left 3 days at −20° C. | Threshold voltage (V r.m.s.) at 25° C.degree | Response time (msec) Tr Td 25° C. | Tr Td 0° C. |
| --- | --- | --- | --- | --- |
| 0 | 60 No freezing | 1.17 | 60 70 | 650 200 |
| 0.4 | 60 No freezing | 1.3 | 50 115 | 400 310 |
| 0.55 | 60 No freezing | 1.4 | 95 120 | 600 390 |
| 0.6 | 60 No freezing | 1.5 | 150 135 | 1,000 510 |

As seen from Table 1, the threshold voltage is low for liquid crystal material according to the invention, and can be varied as required by varying proportions of the mixtures A and B. It is seen also that satisfactorily rapid response times are achieved.

In general, orientability of molecules of the liquid crystal material decreases as the proportion of mixture B is increased, but there are no problems with respect to use of the material in practical display devices for proportions of mixture B up to 60%.

The abovedescribed mixture A was employed in combination with other components to give the following compositions of Examples 2-6.

EXAMPLE 2

Mixture A   60%

CH$_3$O—⟨O⟩—COO—⟨O⟩—C$_5$H$_{11}$   24%

C$_6$H$_{13}$O—⟨O⟩—COO—⟨O⟩—C$_5$H$_{11}$   12%

C$_4$H$_9$—⟨O⟩—COO—⟨O⟩—COO—⟨O⟩—C$_4$H$_9$   4%

Characteristics of the material of Example 2 were as follows:

Liquid crystal temperature range: 60° C.−−20° C. (no freezing after being left 5 days at −20° C.).

| Threshold voltage: 1.25 V r.m.s. | | |
| --- | --- | --- |
| Response time (msec): | 25° C. | 0° C. |
| Tr | 100 | 500 |
| Td | 70 | 180 |

EXAMPLE 3

Mixture A   60%

CH$_3$O—⟨O⟩—COO—⟨O⟩—C$_5$H$_{11}$   16%

CH$_3$O—⟨O⟩—COO—⟨O⟩—C$_6$H$_{13}$   16%

C$_4$H$_9$—⟨O⟩—COO—⟨O⟩—COO—⟨O⟩—C$_4$H$_9$   8%

In selection of the composition of Example 3 account was taken of the fact that orientability varies depending on the type of ester compound employed, and it was anticipated that compounds representable by the general formula

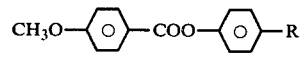

CH$_3$O—⟨O⟩—COO—⟨O⟩—R (R being an alkyl group), which have short side chains and strongly polar molecules would give improved orientability. Orientability of Example 3 was in fact found to be better than that of Examples 1 and 2, the characteristics of Example 3 being as follows.

Liquid crystal temperature range: 58° C.−−20° C. (no freezing after being left 5 days at −20° C.).

| Threshold voltage: 1.25 V r.m.s. | | |
| --- | --- | --- |
| Response time (msec) | 25° C. | 0° C. |
| Tr | 70 | 500 |
| Td | 75 | 230 |

EXAMPLE 4

| Mixture A | 40% |
|---|---|
| CH₃O—⌬—COO—⌬—C₅H₁₁ | 28% |
| C₆H₁₃O—⌬—COO—⌬—C₅H₁₁ | 24% |
| C₄H₉—⌬—COO—⌬—COO—⌬—C₄H₉ | 8% |

Characteristics of the material of Example 4 are as follows:
Liquid crystal temperature range 60°––20° C. (no freezing after being left 5 days at −20° C.).

Threshold voltage: 1.4 V r.m.s.

| Response time (msec) | 25° C. | 0° C. |
|---|---|---|
| Tr | 110 | 700 |
| Td | 90 | 290 |

The characteristics of the compositions of Examples 5–8 are summarized in Table 2 below.

EXAMPLE 5

| Mixture A | 97.5% |
|---|---|
| C₄H₉—⌬—COO—⌬—CN | 2.5% |

The material of this Example showed good response, and had a low threshold value, permitting good display results to be achieved without use of a supplementary stepup circuit, such as must often be used in display devices, in the form of two silver-oxide cells for example. In other words, the material is well-suited to use in very small calculators, or other small display devices, such as watches, for example.

EXAMPLE 6

| Mixture A | 80.0% |
|---|---|
| C₄H₉—⌬—COO—⌬—CN | 5.0% |
| C₅H₁₁—⌬—COO—⌬—CN | 6.0% |
| C₇H₁₅—⌬—COO—⌬—CN | 9.0% |

EXAMPLE 7

| C₅H₁₁—⌬—⌬—CN | 49.3% |
|---|---|
| C₅H₁₁O—⌬—⌬—CN | 13.1% |
| C₇H₁₅O—⌬—⌬—CN | 11.4% |

-continued

| 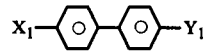 C₈H₁₇O—⌬—⌬—CN | 16.2% |
|---|---|
| C₄H₉—⌬—COO—⌬—CN | 10.0% |

EXAMPLE 8

This example consists simply of the mixture A, and is included as a reference example.

It is seen from Table 2 that the threshold value for mixture A alone is low but the response time is much longer than that of the material of the invention, which offers the advantages of good overall characteristics.

Table 2

| Ex. | Liquid Crystal range | Measurement temperatures | Threshold Voltage | Response time Tr | Td |
|---|---|---|---|---|---|
| 5 | 60° C. – –10° C. or less | 0° C. 25° | 1.28V 1.13 | 900ms 120 | 230ms 80 |
| 7 | 57° C. – –10° C. or less | 0° 25° | 1.15 1.0 | 700 85 | 220 80 |
| 6 | 60° C. – 0° C. or less | 0° 25° | 1.15 1.0 | 950 | 230 |
| A | 61° C. – –10° C. | 0° 25° | 1.32 1.17 | 1500 180 | 130 55 |

Although the present invention has been fully described by way of examples with reference to the attached drawings, it is to be noted that various changes and modifications are apparent to those skilled in the art. Therefore, unless otherwise such changes and modifications depart from the scope of the present invention, they should be construed as being included therein.

What is claimed is:

1. A liquid crystal composition which exists in a nematic mesophase at a temperature of at least −10° C. to 50° C. and which has a net positive dielectric anisotropy consisting essentially of (A) at least one of the compounds represented by the formula:

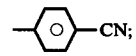

wherein $X_1$ is $C_nH_{(2n+1)}$ or $C_nH_{(2n+1)}O$, n being a number from 4 to 8, and $Y_1$ is —CN or

—⌬—CN;

and (B)(1) at least one of the compounds represented by the formula:

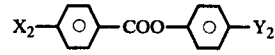

wherein $X_2$ is $C_nH_{(2n+1)}O$ or $C_nH_{(2n+1)}$, and $Y_2$ is $C_nH_{(2n+1)}O$ or $C_nH_{(2n+1)}$, and (2) at least one of the compounds represented by the formula:

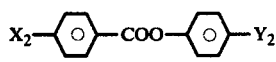

wherein $X_2$ is $C_nH_{(2n+1)}O$ or $C_nH_{(2n+1)}$, and $Y_2$ is

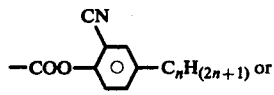

or

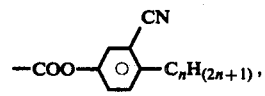

n being a number from 1 to 8, wherein the proportion of (A) to (B) is 1—X:X where X is from 0.4 to 0.6.

2. A liquid crystal composition which exists in a nematic mesophase at a temperature of at least $-10°$ C. to $50°$ C. and which has a net positive dielectric anisotropy consisting essentially of (A) a mixture of

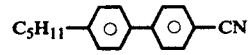

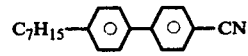

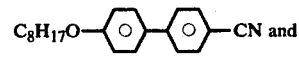

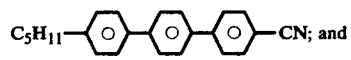

(B) a mixture of

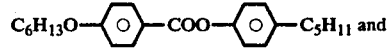

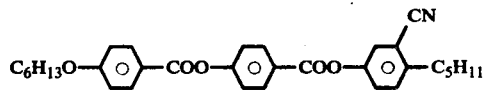

wherein the proportion of (A) to (B) is 1—X:X where X is from 0.4 to 0.6.

* * * * *